(12) United States Patent
Murata et al.

(10) Patent No.: US 6,791,201 B2
(45) Date of Patent: Sep. 14, 2004

(54) STARTER HAVING PINION MOVEMENT RESTRICTING MEMBER

(75) Inventors: Mituhiro Murata, Niwa-gun (JP); Toyohisa Yamada, Kariya (JP); Shinji Usami, Okazaki (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/977,234

(22) Filed: Oct. 16, 2001

(65) Prior Publication Data

US 2002/0047269 A1 Apr. 25, 2002

(30) Foreign Application Priority Data

Oct. 20, 2000 (JP) .......................................... 2000-321160
Jun. 15, 2001 (JP) .......................................... 2001-181278

(51) Int. Cl.⁷ ............................................... F02N 15/04
(52) U.S. Cl. ..................................... 290/38 R; 290/48
(58) Field of Search .............................. 290/48, 38 R, 290/38; 74/7 A, 7 E

(56) References Cited

U.S. PATENT DOCUMENTS

| | | | | |
|---|---|---|---|---|
| 4,260,903 A | * | 4/1981 | Mazzorana | 290/48 |
| 4,818,889 A | * | 4/1989 | Kinoshita | 290/48 |
| 4,902,905 A | * | 2/1990 | Morishita | 290/48 |
| 4,907,464 A | * | 3/1990 | Isozumi | 74/7 A |
| 4,931,663 A | * | 6/1990 | Morishita et al. | 290/48 |
| 5,052,235 A | * | 10/1991 | Isozumi | 290/48 |
| 5,081,874 A |  | 1/1992 | Isozumi |  |

FOREIGN PATENT DOCUMENTS

| | | | | |
|---|---|---|---|---|
| JP | 63-090665 | * | 4/1998 | F02N/11/00 |
| JP | 11-280624 | * | 10/1999 | F02N/11/00 |
| JP | A-2000-9003 |  | 1/2000 |  |

* cited by examiner

*Primary Examiner*—Burton S. Mullins
*Assistant Examiner*—Karen Addison
(74) *Attorney, Agent, or Firm*—Posz & Bethards, PLC

(57) ABSTRACT

In a starter, a pinion is fitted on a pinion shaft such that a rear end surface of the pinion is pressed against a thrust receiving wall provided on the pinion shaft, while a front end surface of the pinion is pressed backward by a detent ring. The detent ring has a tapered surface and fitted in a recess provided on a pinion shaft. A front rising wall defining the recess has a tapered wall so as to correspond to the tapered surface. Since resiliency of the detent ring constricting radially inward is applied to the tapered wall, a component force of the resiliency pressing the pinion axially backward is generated. Thus, the pinion is restricted from moving axially backward by pressing a rear end surface against a thrust receiving wall of the pinion shaft, while the front side surface of the pinion is pressed axially backward through the detent ring.

17 Claims, 5 Drawing Sheets

STARTER HAVING PINION MOVEMENT RESTRICTING MEMBER

CROSS REFERENCE TO RELATED APPLICATION

The present application relates to and incorporates herein by reference Japanese Patent Applications No. 2000-321160 filed on Oct. 20, 2000, and No. 2001-181278 filed on Jun. 15, 2001.

BACKGROUND OF THE INVENTION

The present invention relates to a starter, in which a pinion shaft integrally moves backward and forward with a pinion.

In a conventional starter disclosed in JP-A-2000-9003, a pinion shaft is integrated with an inner surface of a one-way clutch and a pinion is fitted to the pinion shaft in a rotation-restricted manner. The pinion shaft is integrally pushed forward with the pinion by using an attracting force (pull-in force for pulling a plunger) of a magnet switch. As shown in FIG. 9, a clip 100 is fitted in a circumferential recess 120 provided on the pinion shaft 110 to restrict the pinion from moving in an axial direction.

However, a width of the circumferential recess 120 is set larger than a thickness of the clip 100 for installing the clip 100. Therefore, a clearance remains between the clip 100 and the pinion 130 so that the pinion 130 becomes unsteady against the pinion shaft 110. In this case, the pinion 130 is abraded by fretting due to small vibrations. As a result, a harsh chattering sound is generated at the time of starting an engine. Also, by the vibrations of the pinion 130, an abrasion of a ring gear which meshes with the pinion 130 is likely to increase. Further, right after the engine starts, if the pinion 130 is turned by a ring gear at high speeds, the clip 100 is expanded by a self-centrifugal force and disengaged from the recess 120.

SUMMARY OF THE INVENTION

In view of the foregoing problems, it is an object of the present invention to restrict vibrations of a pinion against a pinion shaft in a starter, in which the pinion is integrally pushed forward with the pinion shaft at the time of starting an engine.

According to one aspect of the present invention, a pinion is fitted on a pinion shaft such that a rear end surface of the pinion is pressed against a step provided on the pinion shaft while a front end surface of the pinion is pressed backward through a restricting member such as a detent ring. Since the pinion is restricted from moving in an axial direction by being pressed against the pinion shaft, the vibrations of the pinion is decreased.

Further, the restricting member fitted in a recess of the pinion shaft has a tapered surface on a front side inner periphery thereof. Also, a front rising wall defining the recess has a tapered wall so as to correspond to the tapered surface of the restricting member. When resiliency of the detent ring contracting radially inward is applied to the tapered wall defining the recess, a component force of the resiliency pressing the pinion axially backward is generated. Thus, the pinion is press-fitted against the step of the pinion shaft. In addition, a cover is provided for restricting the detent ring from expanding in the radial direction and being disengaged from the pinion shaft when the pinion shaft rotates at high speeds.

According to another aspect of the present invention, a pinion shaft has a thrust receiving wall for restricting a pinion from moving axially backward. The pinion is fitted on the pinion shaft such that a rear end surface of the pinion adjacently faces the thrust receiving wall of the pinion shaft in an axial direction. When the pinion meshes with a ring gear of an engine at the time of starting the engine, the rear end surface of the pinion contacts the thrust receiving wall of the pinion shaft by a relative movement with the pinion shaft. Therefore, the pinion is restricted from inclining with respect to the pinion shaft.

Further, a pressing member is provided between the pinion and the pinion shaft at the rear side of the pinion to press the pinion against the detent ring with respect to the pinion shaft. Thus, the vibrations of the pinion against the pinion shaft are suppressed.

BRIEF DESCRIPTION OF THE DRAWINGS

Other objects, features and advantages of the present invention will become more apparent from the following detailed description made with reference to the accompanying drawings.

In the drawings.

DETAILED DESCRIPTION OF PREFERRED EMBODIMENTS

Preferred embodiments of the present invention will be described hereinafter with reference to figures.

First Embodiment

Figure 1:
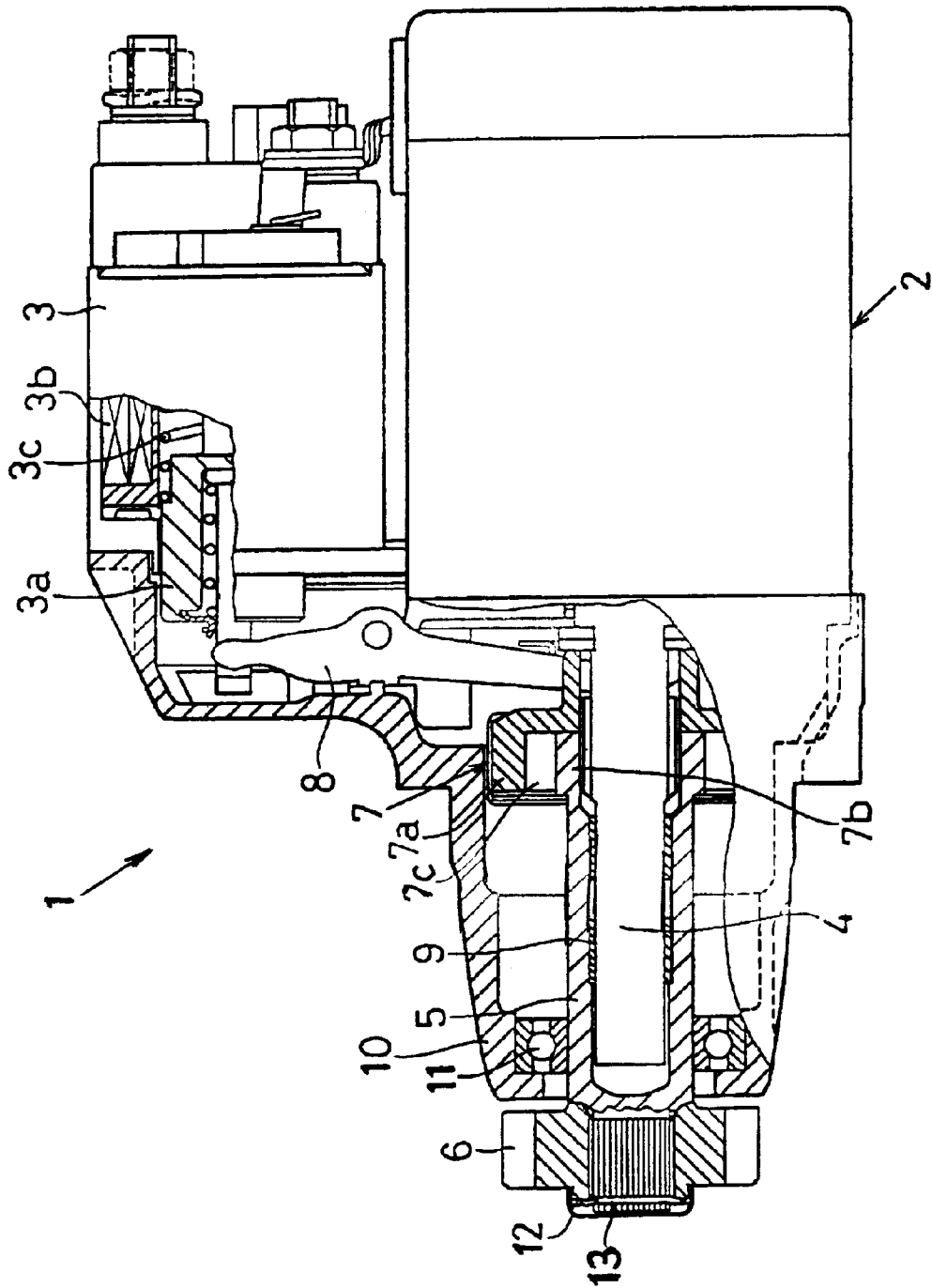
FIG. 1 is a schematic view of a starter, partially in cross-section, according to a first embodiment of the present invention.

As shown in FIG. 1, a starter 1 of the present embodiment has a starting motor 2 for generating rotation force, a magnet switch 3 for turning on the starting motor 2, an output shaft 4 driven by the starting motor 2, a pinion shaft provided slidably in an axial direction of the output shaft 4 (right-left direction in FIG. 1), a pinion 6 fitted on the pinion shaft in a rotation-restricted manner, a one-way clutch 7 for transmitting a rotation of the output shaft 4 to the pinion shaft 5, and the like.

The starting motor 2 is a known d. c. motor. When a key switch (not shown) is turned on and an inner contact (not shown) in the magnet switch 3 is connected, an armature (not shown) is turned on and begins to rotate.

The magnet switch 3 has a plunger 3a provided slidably in the axial direction(left-right direction in FIG. 1), and a winding 3b for generating pull-in force to shift the plunger 3a. The inner contact is connected/disconnected with a shift of the plunger 3a. Also, the pull-in force for shifting the plunger 3a is transmitted to the one-way clutch 7 through a lever 8.

The output shaft 4 is disposed in a coaxially aligned manner with a rotary shaft (not shown) of the starting motor 2. The rotation of the starting motor 2 is transmitted to the output shaft 4 via a gear reduction device (not shown).

Figure 2:
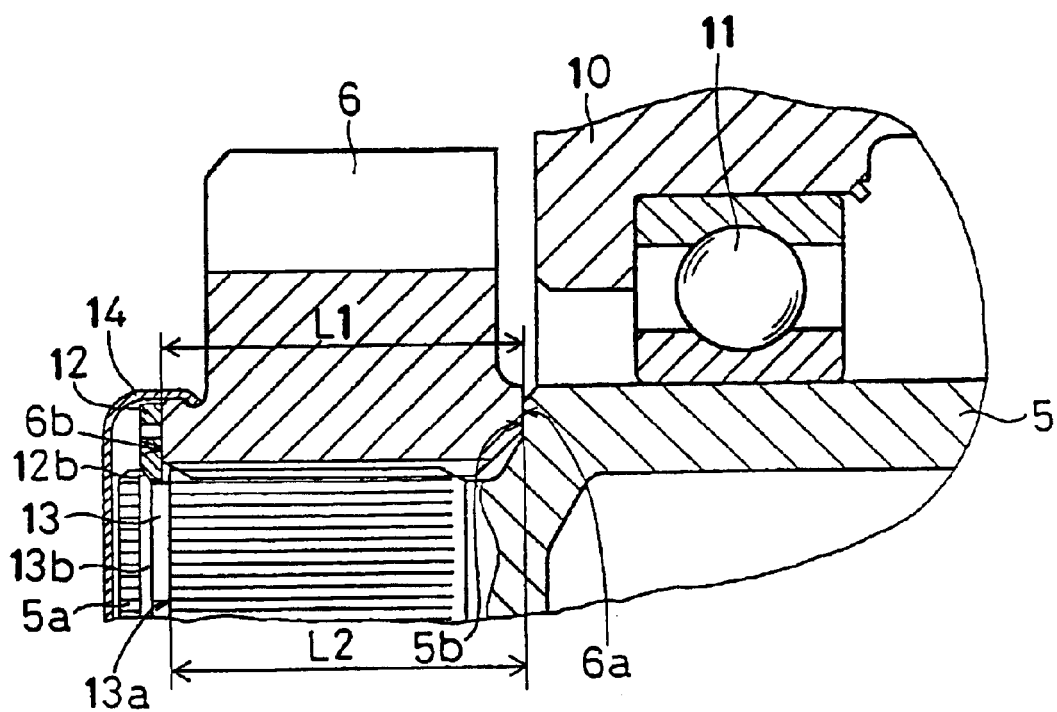
FIG. 2 is a cross-sectional view around a pinion according to the first embodiment.

On an outer peripheral surface of a front end portion of the pinion shaft 5, splines 5a are formed to engage with the pinion 6 as shown in FIG. 2. A rear side of the pinion shaft is in a cylindrical shape and the cylindrical portion is fitted on an outer periphery of the output shaft 4 through a bearing 9. The outer peripheral surface of the cylindrical portion of the pinion shaft is supported rotatably and slidably (backward and forward) against a bearing 11 fixed to a front casing 10. As shown in FIG. 2, on the outer peripheral surface of the front end portion of the pinion shaft 5, a circumferential recess 13 for installing a detent ring 12 is formed. The detent ring 12 operates as an axial-movement restricting member.

The one-way clutch 7 includes a clutch outer 7a for receiving a rotation of the output shaft 4 through helical splines, a clutch inner 7b integrally formed with the cylindrical portion of the pinion shaft 5, rollers 7c for transmitting a rotation of the clutch outer 7a to the clutch inner 7b, and the like.

The one-way clutch 7 transmits the rotation of the output shaft 4 to the pinion shaft at the time of starting an engine. Further, when a rotation speed of the pinion shaft becomes higher than that of the output shaft 4, the one-way clutch 7 interrupts a motive power transmission between the output shaft 4 and the pinion shaft to restrict the armature from overrunning.

As shown in FIG. 2, the pinion 6 is combined with the front end portion of the pinion shaft 5 through splines 5a. At a front end of the cylindrical portion of the pinion shaft 5, a step is provided for receiving the pinion 6 as a thrust receiving wall 5b. A rear end surface 6a of the pinion 6 is in press-contact with a thrust receiving wall 5b so that an axially backward movement of the pinion 6 is restricted, while an axially forward movement of the pinion 6 is restricted by the detent ring 12 fitted in the circumferential recess 13 of the pinion shaft 5.

Figure 3A:
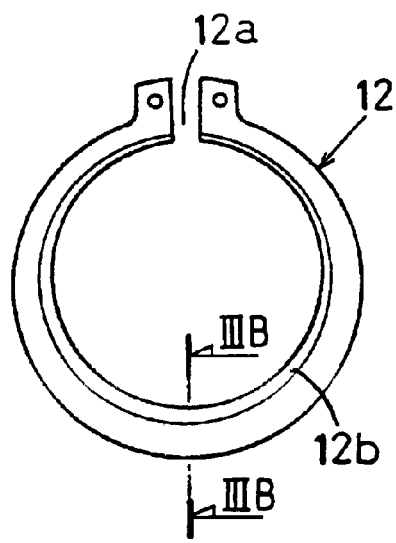
FIG. 3A is a front view and FIG. 3B is a cross-sectional view of a detent ring according to the first embodiment.

As shown in FIG. 3A, the detent ring 12 is formed into a ring having an opening 12a at a position its periphery. The detent ring 12 is fitted in the recess 13 provided on the outer peripheral surface of the pinion shaft 5.

Figure 3B:
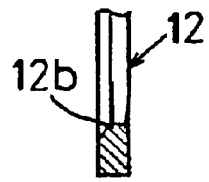

As shown in FIG. 3B, the detent ring 12 has a tapered surface 12a at a front side inner periphery thereof. Also, a front rising wall defining the recess 13 has a tapered wall 13b (see FIG. 2) so as to correspond to the tapered surface 12b of the detent ring 12. The inner diameter of the detent ring 12 is set slightly smaller than an outer diameter of the front end portion of the pinion shaft 5.

For fitting the detent ring 12 in the circumferential recess 13, the opening 12a is expanded in the peripheral direction so as to increase the inner diameter and passed through the pinion shaft 5. Then, when a power for expanding the opening 12a is removed, the detent ring 12 contracts radially inward by a self-resiliency and fits in the recess 13. A rear surface (pinion side end surface) of the detent ring 12 press-contacts the front end surface 6b of the pinion 6. The tapered surface 12b of the detent ring 12 press-contacts the tapered wall 13b of the recess 13. Therefore, the detent ring 12 does not contract to an original form (state having no resiliency) so that the resiliency remains. Thus, the resiliency of the detent ring 12 is applied to the tapered wall 13b of the recess 13 so that the component force of the resiliency is generated in the axial direction. This component force is applied to the front end surface 6b of the pinion 6 through the detent ring 12.

A cover 14 is attached at the front end portion of the pinion shaft in order to restrict the detent ring 12 from expanding in a radial direction. As shown in FIG. 2, the cover 14 has a cap shape and covers the front end portion of the pinion shaft and an outer periphery of the detent ring 12. An outer peripheral edge of the cover 14 is crimped in a step provided on a front periphery of the pinion 6.

Next, operation of the starter 1 will be described.

When the key switch is turned on, the inner contact in the magnet switch 3 is connected. The armature is turned on and begins to rotate. A rotation speed of the armature is reduced by the gear reduction device, and then, the rotation is transmitted to the output shaft 4. Further, the rotation of the output shaft 4 is transmitted to the pinion shaft through the one-way clutch 7.

Moreover, when the pull-in force generated in the magnet switch 3 is transmitted to the one-way clutch 7 through the lever 8, the one-way clutch 7 is pushed forward so that the pinion shaft is pushed forward along the outer surface of the output shaft 4 (to the left side in FIG. 1). In this way, the pinion 6 fitted on the pinion shaft meshes with a ring gear of an engine (not shown) so that the ring gear rotates.

After the engine is started by the rotation of the ring gear, when the key switch is turned off, an electric current to the winding 3b is shut off so that the pull-in force of the magnet switch 3 extinguishes. Therefore, the plunger 3a returns to a stationary position (position in FIG. 1). At this time, a power returning the plunger 3a to the stationary position is transmitted to the one way clutch 7 through the lever 8. Then, the pinion shaft is integrally pulled back along the output shaft 4 with the one-way clutch 7 (in the right direction in FIG. 1). The pinion 6 moves away from the ring gear and returns to the stationary position. Further, due to disconnection of the inner contact in the magnet switch 3, the electric current to the armature is shut off to stop armature rotation.

In the present embodiment, the starter 1 has the tapered wall 13b defining the recess 13 and the tapered surface 12b of the detent ring 12 so that a press-contacting force generated by the detent ring 12 is applied to the front end surface 6b of the pinion 6. As a result, the rear end surface 6a of the pinion 6 press-contacts the thrust receiving wall 6b of the pinion shaft so that the pinion 6 is restricted from moving backward, while the front end surface 6b is pressed axially backward through the detent ring 12. Thus, the pinion 6 is press-fitted to the pinion shaft so that the movement in the axial direction is restricted. Moreover, the pinion 6 is suppressed from being abraded by fretting due to small vibrations. Furthermore, since the vibrations of the pinion 6 against the pinion shaft is suppressed, an abrasion of the ring gear and a harsh rattling sound are sufficiently reduced.

Further, in the present embodiment, the cover 14 is provided at the front end of the pinion shaft to cover the outer periphery of the detent ring 12. Therefore, the detent ring 12 is restricted from expanding in the radial direction due to centrifugal force while the pinion shaft rotates at high speeds. Accordingly, the detent ring 12 is restricted from disengaging from the pinion shaft 5.

Here, the distance L1 is set larger than the distance L2 (L1>L2) in order to effectively apply the wedging force of the detent ring 12 against the pinion 6. Also, the distance L1 may be set equal to the distance L2 (L1=L2). In this case, the pinion 6 is pressed in the axial direction through the detent ring 12.

Second Embodiment

A second embodiment shows an example, in which the detent ring 12 generates resiliency for pressing the pinion 6 backward in a state that the detent ring 12 is fitted in the recess 13 provided on the pinion shaft 5.

Figure 4:
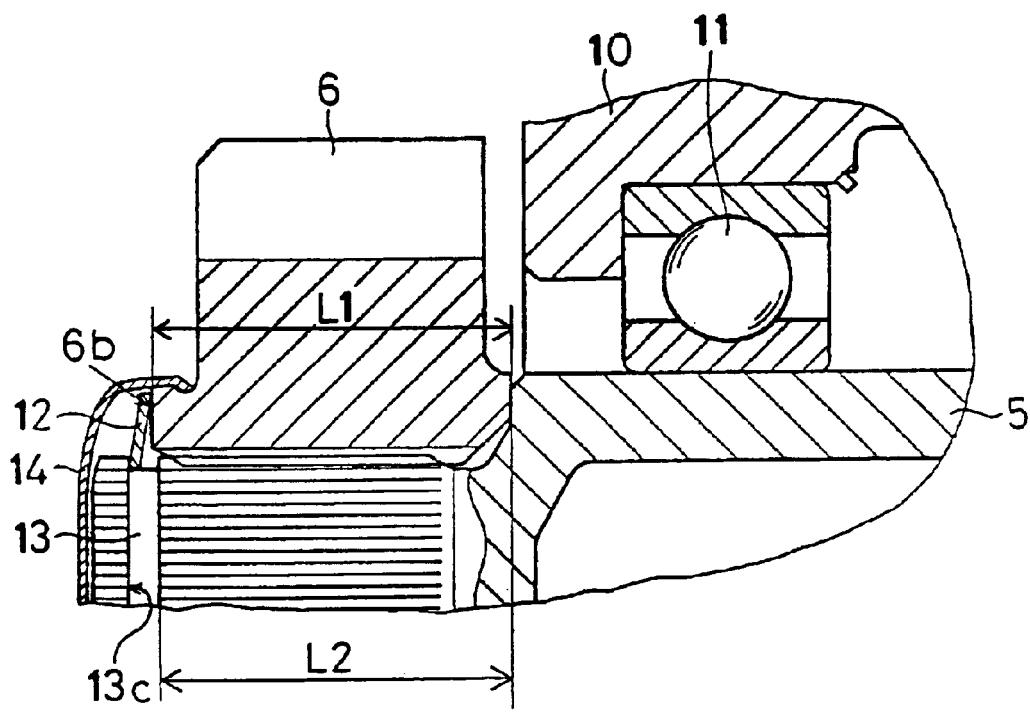
FIG. 4 is a cross-sectional view around a pinion according to a second embodiment of the present invention.

As shown in FIG. 4, the detent ring 12 is fitted in the recess 13 in such a manner that the inner periphery of the detent ring 12 is attached to the front rising wall 13c defining the recess 13 while the outer periphery of the detent ring 12 is attached to the front end surface 6b of the pinion 6. Thus, the detent ring 12 is fitted while being resiliently deformed between the front rising wall 13c defining the recess 13 and the front end surface 6b of the pinion 6b.

Figure 5A:
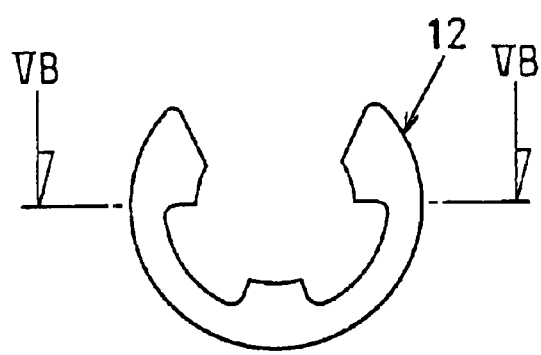
FIG. 5A is a front view and FIG. 5B is a cross-sectional view of a detent ring according to the second embodiment.
Figure 5B:

Since the detent ring 12 functions as a coned disc spring, the resiliency of the detent ring 12 is applied to the front end surface 6b of the pinion 6 so that the pinion 6 is pressed axially backward. Thus, the pinion 6 is press-fitted against the pinion shaft 5. FIG. 5 shows an example of the detent ring 12 used in the present embodiment.

In this embodiment, it is not always necessary to set the distance L1 larger than the distance L2 (L1>L2), but may be set equal to the distance L2 (L1=L2). Further, the distance L1 may be smaller than the distance L2 (L1<12) as long as the resiliency of the detent ring 12 is applied to the pinion 6.

Third Embodiment

Figure 6:
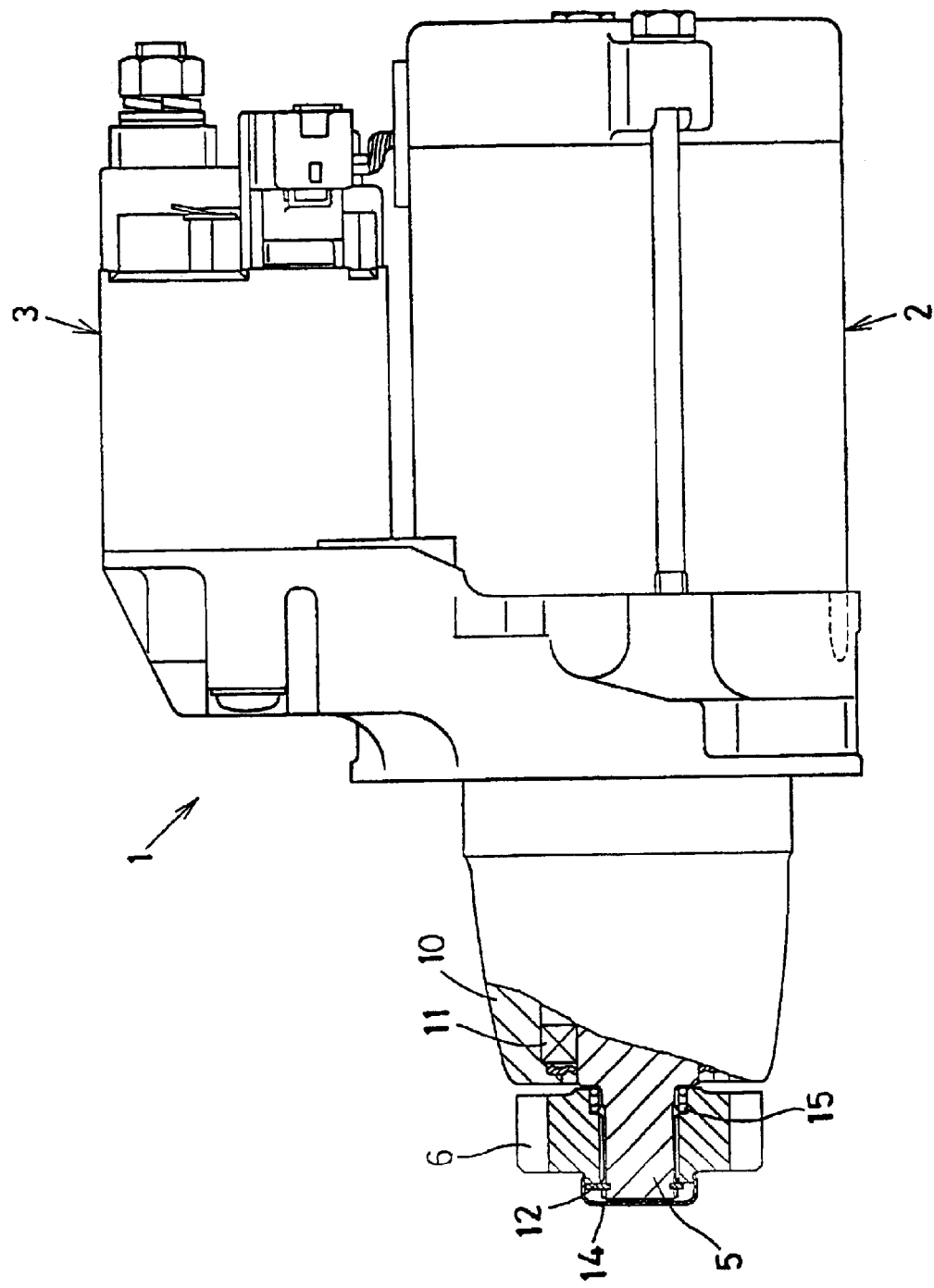
FIG. 6 is a schematic view of a starter according to a third embodiment of the present invention.

As shown in FIG. 6, in the present embodiment, a structure for preventing the vibrations of the pinion 6 against the pinion shaft 5 differs from that in the first embodiment. Since a fundamental structure of the starter 1 shown in FIG. 6 is similar to that of the first embodiment shown in FIG. 1, a description is simplified.

Figure 7:
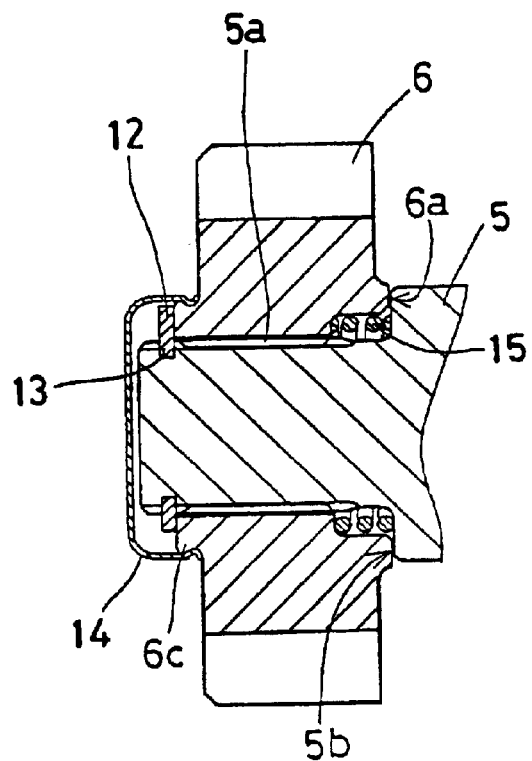
FIG. 7 is a cross-sectional view around a pinion according to the third embodiment.

As shown in FIG. 7, splines 5a are formed on the outer peripheral surface of the front end portion of the pinion shaft 5. At the rear end of the splines 5a of the pinion shaft 5, the thrust receiving wall 5b is provided to restrict the pinion 6 from moving axially backward. Also, the circumferential recess 13 is provided on the outer peripheral surface of the front end portion of the pinion shaft 5, and the detent ring 12 (e.g. C-clip) is fitted therein.

The pinion 6 is connected to the pinion shaft through splines 5a and restricted from moving axially forward by press-contacting the front end surface of the pinion 6 against the detent ring 12. A spring chamber is provided between the inner periphery of the rear end portion of the pinion 6 and the pinion shaft (See FIG. 7). A pring to be connected to the pinion 6 and the pinion shaft are arranged in the spring chamber.

As shown in FIG. 7, a part of the rear surface of the pinion 6 which corresponds to the outer peripheral side of the spring chamber is protruded backward. The rear surface 6a of the protrusion adjacently faces to the thrust receiving wall 5b of the pinion shaft in the axial direction.

One end of the spring 15 is connected to the front rising wall defining the spring chamber and the other end of the spring is connected to the thrust receiving wall 5b of the pinion shaft 5. Therefore, the pinion 6 is pressed axially forward against the pinion shaft 5. Moreover, the front end surface of the pinion 6 is pressed against the detent ring 12 so that the pinion 6 is restricted from moving in the axial direction.

Further, the cover 14 is provided over the front end portion of the pinion shaft 5. As shown in FIG. 7, the cover 14 surrounds the detent ring 12 and the outer periphery of the cover 14 is fitted in the circumferential groove 6c of the pinion 6.

In the above structure, the pinion 6 is restricted from moving the axial direction against the pinion shaft by being pressed to the detent ring 12 by the spring so that the vibrations of the pinion 6 is suppressed.

Since the rear end surface 6a of the pinion 6 is adjacently provided to the thrust receiving wall 5b of the pinion shaft in the axial direction, the rear surface 6a of the pinion 6 presses the thrust receiving wall 5b of the pinion shaft when the pinion 6 meshes with the ring gear. Therefore, the pinion 6 is restricted from inclining against the pinion shaft so that the pinion 6 is successfully meshed with the ring gear.

Moreover, an axially forward movement of the pinion 6 is restricted only by a single component of the detent ring 12. Therefore, the length of the pinion shaft which protrudes ahead of the pinion 6 is shortened so that the axial length of the starter 1 can be decreased.

Further, the cover 14 is arranged over the front end portion of the pinion shaft 5, thereby preventing entering of foreign materials between the pinion 6 and the pinion shaft 5. Therefore, the starter 1 provides dust-proofness.

Figure 8:
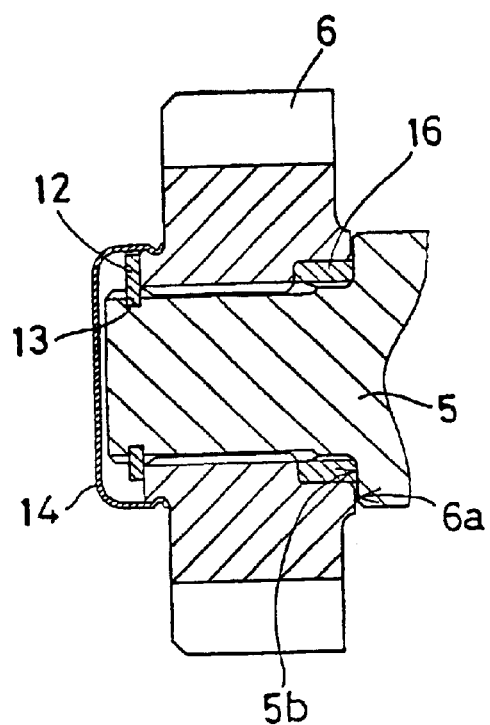
FIG. 8 is a cross-sectional view around the pinion according to the third embodiment.
Figure 9:
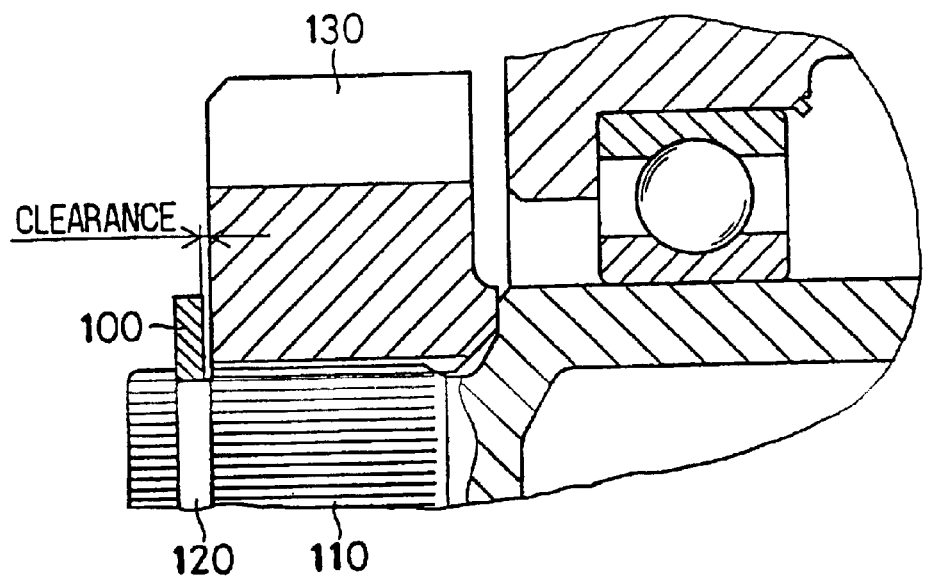
FIG. 9 is a cross-sectional view around a pinion according to a conventional starter.

In the third embodiment, the spring is used as a pressing member for pressing the pinion 6 axially forward. As shown in FIG. 8, an elastic member 16 such as rubber may be used in place of the spring 15.

The present invention should not be limited to the disclosed embodiments, but may be implemented in other ways without depending from the spirit of the invention.

What is claimed is:

1. A starter comprising:
    a starting motor for generating rotation force;
    a pinion shaft rotatable by the starting motor and supported slidably in an axial direction, the pinion shaft having a recess on an outer periphery of a front end portion thereof and a step on the outer periphery thereof;
    a pinion fitted on the pinion shaft in a rotation-restricted manner relative to the pinion shaft and movable forward integrally with the pinion shaft, wherein the pinion has a front end surface and a rear end surface, wherein the front end surface is further from the motor than the rear end surface and the rear end surface adjacently faces the step in the axial direction;
    a restricting member fitted in the recess in front of the pinion in an axial direction to receive the front end surface of the pinion; and
    a pressing member disposed between the pinion and the step of the pinion shaft for pressing the pinion toward the restricting member relative to the pinion shaft, wherein the pinion is movable toward the step of the pinion shaft while compressing the pressing member up to a position at which the rear end surface of the pinion and the step of the pinion shaft come into direct contact with each other.

2. The starter as in claim 1, further comprising:
    a cover for restricting the restricting member from disengaging radially outward from the pinion shaft when the pinion shaft is rotated by the starting motor.

3. The starter as in claim 2, wherein:
    the cover is provided at a front end portion of the pinion shaft and fixed to the pinion to surround an outer periphery of the restricting member.

4. A pinion configuration for a starter comprising:
- a rotatable pinion shaft slidably supported in an axial direction and having a fist end and a second end, the second end having a step on an outer periphery thereof, the step having a wall rising from the outer periphery of the pinion shaft in a radial direction;
- a pinion fitted on the second end of the pinion shaft in front of the step in the axial direction, wherein the pinion has a front end surface and a rear end surface, the rear end surface being opposite to the front end surface and adjacently facing the rising wall of the step in the axial direction; and
- a pressing member disposed between a rear end portion of the pinion and the rising wall of the step, wherein the pressing member normally presses the pinion in a direction away from the first end of the pinion shaft, and wherein the rear end surface of the pinion is brought into contact with the rising wall of the step while compressing the pressing member when the pinion contacts a ring gear for starting an engine.

5. The starter pinion configuration according to claim 4, further comprising a restricting member fitted on the second end of the pinion shaft in front of the pinion, wherein the front end surface of the pinion is in press-contact with the restricting member by the pressing member.

6. The starter pinion configuration according to claim 4, wherein the pressing member includes a spring, and a first end of the spring is connected to the rear end portion of the pinion and a second end of the spring is connected to the rising wall of the step.

7. The pinion configuration according to claim 5, further comprising a starting motor for generating a rotation force for rotating the pinion shaft, wherein the restricting member presses the pinion toward the motor.

8. The stator according to claim 1, wherein an outer peripheral portion of the sear end surface of the pinion protrudes toward the step in the axial direction for defining a chamber in an inner periphery of the pinion, and the pressing member is housed in the chamber.

9. The stator according to claim 8, wherein the pressing member includes a spring, wherein a front end of the spring is in contact with an inner peripheral portion of the rear end surface of the pinion, which defines a front end of the chamber, and a rear end of the spring is in contact with the step.

10. The stator according to claim 1, wherein the pinion is connected with the pinion shaft through splines.

11. The stator according to claim 8, wherein the rear end surface of the pinion and a rear end of the pressing member are brought into contact with the step before the pressing member is completely compressed when the pinion contacts a ring gear.

12. The starter according to claim 1, wherein the pinion has teeth axially extending within an axial range between the front end surface and the rear end surface of the pinion, and no part of the pinion is located radially outside of the step.

13. The starter according to claim 1, wherein the step is defined on the pinion shaft between a smaller diameter portion of the pinion shaft and a greater diameter portion of the pinion shaft, wherein the smaller diameter portion is located on an end of the pinion shaft, and the pinion is only located outside the smaller diameter portion, and no part of the pinion is movable on the greater diameter portion beyond the step.

14. The starter according to claim 1, wherein:
- the step is defined on the pinion shaft between a smaller diameter portion of the pinion shaft and a greater diameter portion of the pinion shaft;
- the smaller diameter portion is located on an end of the pinion shaft;
- the pinion is only located outside the smaller diameter portion;
- a chamber is formed in an inner surface of the pinion for housing the pressing member; and
- an inside diameter of the pinion, where the chamber is formed, is smaller than the outside diameter of the greater diameter portion of the pinion shaft.

15. The starter according to claim 4, wherein the pinion has teeth axially extending within an axial range between the front end surface and the rear end surface of the pinion, and no part of the pinion is located radially outside of the step.

16. The starter according to claim 4, wherein the step is defined on the pinion shaft between a smaller diameter portion of the pinion shaft and a greater diameter portion of the pinion shaft, wherein the smaller diameter portion is located on an end of the pinion shaft, and the pinion is only located outside the smaller diameter portion, and no part of the pinion is movable on the greater diameter portion beyond the step.

17. The starter according to claim 4, wherein:
- the step is defined on the pinion shaft between a smaller diameter portion of the pinion shaft and a greater diameter portion of the pinion shaft;
- the smaller diameter portion is located on an end of the pinion shaft;
- a chamber, which is adjacent to the rear end surface of the pinion, is formed between an inner surface of the pinion and the pinion shaft for housing the pressing member;
- an inside diameter of the pinion, where the chamber is formed, is smaller than the outside diameter of the greater diameter portion of the pinion shaft;
- the pinion is located on the smaller diameter portion and is movable toward the step while compressing the pressing member, and
- the rear end surface of the pinion is brought into contact with the rising wall of the step before the pressing member is completely compressed.

* * * * *